US010961089B2

(12) United States Patent
Berenguer Atenza

(10) Patent No.: US 10,961,089 B2
(45) Date of Patent: *Mar. 30, 2021

(54) CABLE MACHINE WITH MULTIPLE BEARINGS

(71) Applicant: CONSTRUCCIONES MECANICAS CABALLE, S.A., Badalona (ES)

(72) Inventor: Antonio Berenguer Atenza, Badalona (ES)

(73) Assignee: CONSTRUCCIONES MECANICAS CABALLE, S.A., Barcelona (ES)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,273

(22) Filed: Apr. 22, 2020

(65) Prior Publication Data
US 2020/0247649 A1 Aug. 6, 2020

Related U.S. Application Data

(63) Continuation of application No. 16/275,143, filed on Feb. 13, 2019, now Pat. No. 10,662,038.

(30) Foreign Application Priority Data

Apr. 3, 2018 (EP) .................................... 18382227

(51) Int. Cl.
*B66D 1/14* (2006.01)
*D07B 3/04* (2006.01)
(Continued)

(52) U.S. Cl.
CPC ................. *B66D 1/14* (2013.01); *D07B 3/04* (2013.01); *D07B 7/06* (2013.01); *F16C 19/00* (2013.01);
(Continued)

(58) Field of Classification Search
CPC ... B66D 1/14; B66D 3/04; D07B 3/04; D07B 7/06; D07B 2207/209; D07B 2207/409; F16C 19/00
See application file for complete search history.

(56) References Cited

U.S. PATENT DOCUMENTS 1,747,745 A * 2/1930 Venable ................... B66D 3/04
384/547
3,061,234 A * 10/1962 Morey ............... B65H 75/4434
242/378.2
(Continued)

FOREIGN PATENT DOCUMENTS

DE 3209169 A1 9/1983
GB 1014023 A 12/1965
GB 2114176 A 8/1983

OTHER PUBLICATIONS

European Search Report for Application No. EP18382227, dated Sep. 26, 2018, in 6 pages.
(Continued)

*Primary Examiner* — Michael E Gallion
(74) *Attorney, Agent, or Firm* — Knobbe, Martens, Olson & Bear, LLP

(57) ABSTRACT

A machine for manufacturing cables includes a winch that includes a tube, which includes at least a pulley, a reducer and an input shaft to the reducer in its interior. A system for attaching the reducer includes two concentric bearings. An outer bearing is attached to the reducer and the tube, and an inner bearing is attached to the pulley and outer bearing, such that the pulley is supported by the inner bearing and by bearings of the input shaft of the reducer.

9 Claims, 1 Drawing Sheet

(51) Int. Cl.
*F16C 19/00* (2006.01)
*D07B 7/06* (2006.01)

(52) U.S. Cl.
CPC ........... *B66D 2700/0183* (2013.01); *D07B 2207/209* (2013.01); *D07B 2207/409* (2013.01)

(56) References Cited

U.S. PATENT DOCUMENTS

| | | | | |
|---|---|---|---|---|
| 3,128,857 | A * | 4/1964 | Walton | H02G 11/02 191/12.2 R |
| 3,147,581 | A * | 9/1964 | Godderidge | D07B 3/10 57/58.63 |
| 3,250,516 | A * | 5/1966 | Silberger | B66D 3/04 254/409 |
| 3,512,757 | A * | 5/1970 | Ostrom | B66D 3/04 254/266 |
| 3,528,645 | A * | 9/1970 | Harken | B66D 3/04 254/412 |
| 3,539,123 | A * | 11/1970 | Shutt | B65H 75/4449 242/386 |
| 3,757,959 | A * | 9/1973 | Thompson | B66D 3/04 212/271 |
| 3,822,834 | A * | 7/1974 | Fjarlie | H02G 11/02 242/388.5 |
| 4,328,662 | A * | 5/1982 | Bretegnier | D07B 3/10 57/58.61 |
| 6,301,871 | B1 * | 10/2001 | Recchia | D07B 7/02 226/190 |
| 7,673,851 | B2 * | 3/2010 | Lange | F16C 19/381 254/409 |
| 9,187,298 | B2 * | 11/2015 | DeSoo | B66D 3/04 |
| 9,908,749 | B2 * | 3/2018 | Lob | B66D 3/04 |
| 10,435,962 | B2 * | 10/2019 | Nunes | B66C 13/10 |
| 10,662,038 | B2 * | 5/2020 | Berenguer Atenza | F16C 19/00 |
| 2019/0300341 | A1 * | 10/2019 | Berenguer Atenza | D07B 7/06 |

OTHER PUBLICATIONS

Final Office Action for U.S. Appl. No. 16/275,143, dated Nov. 15, 2019 in 7 pages.
Notice of Allowance for U.S. Appl. No. 16/275,143, dated Feb. 4, 2020 in 6 pages.
Office Action for U.S. Appl. No. 16/275,143, dated Jun. 13, 2019 in 13 pages.

* cited by examiner

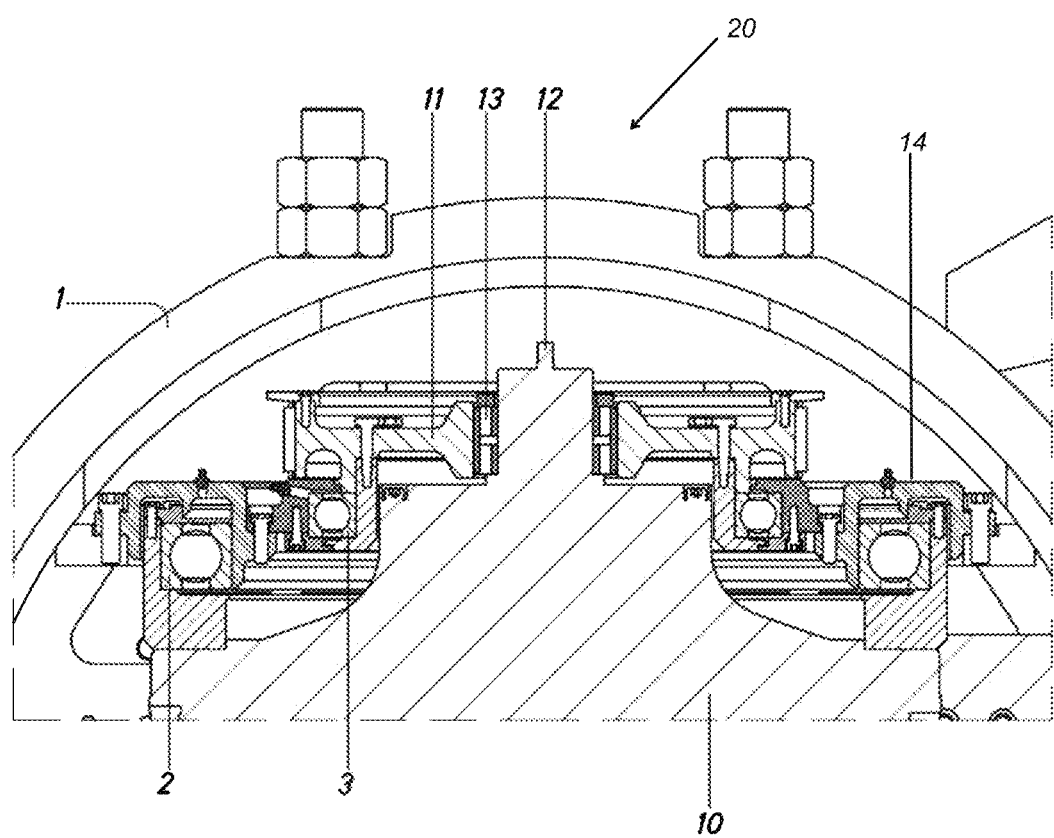

CABLE MACHINE WITH MULTIPLE BEARINGS

CROSS-REFERENCE TO RELATED APPLICATIONS

This application is a continuation of U.S. application Ser. No. 16/275,143, filed on Feb. 13, 2019, now granted, which claims priority to European Patent Application No. 18382227.9 filed on Apr. 3, 2018, the disclosure of which including the specification, the drawings, and the claims is hereby incorporated by reference in its entirety.

FIELD OF THE INVENTION

The present invention relates to machines for manufacturing cables and, more specifically, to machines for manufacturing cables and comprising a rotary winch.

Said winch comprises a tube, which can have a large diameter, for example of up to 1.5 metres, rotating at high speeds, typically in the order of up to 650 rpm. Said tube must comprise in the interior thereof power generation or transmission elements, despite the lack of space.

BACKGROUND OF THE INVENTION

Various challenges arise when arranging power elements, for example a reducer, in the space inside the tube of a winch. In particular, the system for attaching said power elements must:
- withstand the high stresses in the pulley and in the input shaft of the reducer produced by centrifugal forces,
- withstand the high tensile force produced by the drive belt from the motor,
- withstand the gyroscopic torque resulting from the rotation of the rotor and the rotation of the input shaft of the reducer, since both rotate with respect to perpendicular axes.

According to the prior art, these problems can be solved by providing two pulleys, one on each side of the reducer. This has the disadvantage that space is further reduced and is brought out of alignment.

SUMMARY OF THE INVENTION

An object of the invention is to disclose attachment means inside the tube of a rotary winch for a machine for manufacturing cables which overcomes the aforementioned challenges, increasing the service life of the attachment system and/or allowing greater rotational speeds of the winch.

For this purpose, the present invention discloses a machine for manufacturing cables which comprises a winch which, in turn, comprises a tube comprising in the interior thereof at least a pulley, a reducer and an input shaft to the reducer, characterised in that the system for attaching the reducer comprises two concentric bearings, the outer bearing being attached to the pulley and the tube, and the inner bearing being attached to the pulley and the outer bearing, such that the pulley is supported by said inner bearing and by bearings of said input shaft of the reducer.

The present invention provides statically indeterminate bearing support for the pulley, which prevents premature wear of the bearings of the pulley which would otherwise occur for the above-mentioned reasons, and in particular as a result of the gyroscopic torque.

The present invention allows for there to be a single pulley connected to the reducer.

Preferably, the outer bearing and the inner bearing are in different planes.

Preferably, too, the outer bearing is connected to the reducer by the outer face thereof, and to the tube by the inner face thereof.

Preferably, the inner bearing and the outer bearing are attached to one another between the outer face of inner bearing and the outer face of the outer bearing.

More preferably, the inner bearing and the outer bearing are attached to one another by means of a structure that attaches the outer bearing to the tube.

On account of the improved performance and longer service life of the system for attaching the internal components of the winch according to the invention, it is possible to increase the operating speed of the winch to more than 650 rpm, and preferably to 850 rpm.

In the present invention, when it is stated that a first component is attached to a second component, this means that both components are functionally attached to one another during normal operation of the machine, either directly or by means of structures intended for connecting both components.

BRIEF DESCRIPTION OF THE DRAWINGS

To aid understanding, an explanatory yet non-limiting drawing is included of an embodiment of the machine according to the invention.

FIG. 1 is a cross-sectional view of a detail of the upper portion of a winch of a machine for manufacturing cables according to the present invention.

DETAILED DESCRIPTION OF THE PREFERRED EMBODIMENTS

The FIGURE shows the upper portion of an upper section of the tube -1- of a winch -20- according to the present invention.

In said FIGURE, two bearings -2-, -3- are shown which are mutually concentric. In particular, both bearings are ball bearings. The outer bearing -2- is attached, by the outer face thereof, to the reducer -10- and, by the inner face thereof, to the inner face of the tube -1-.

In turn, the inner bearing -3- is attached to the pulley -11- by the inner face thereof and to the outer bearing -2- by the outer face of the inner bearing -3-. In particular, in the example, the inner bearing is attached to the structure -14- that attaches the outer bearing -2- to the tube -1-. According to another aspect, the inner bearing -3- is attached to the inner face of the outer bearing -2-.

As shown, both bearings -2-, -3- are in different planes. More specifically, the inner bearing -3- is raised with respect to the outer bearing -2-.

As shown, the pulley -11- is held on the inner bearing -3- by means of a corresponding structure and on the bearings -13- of the input shaft -12- of the reducer -10-.

As shown in the FIGURES, the outer and inner bearings, the pulley and the reducer are connected according to the specifications indicated above, either by means of direct abutment or by means of structural components of which the purpose is to carry out the assigned attaching function. Said structures are connected by abutment, welding and/or screwing, as shown in the FIGURES.

In the present invention, when it is stated that a bearing is attached to two components, this means that each of said components is connected to one of the parts of the bearing that are in relative movement (such as the faces of a ball bearing).

Although the invention has been set out and described with reference to embodiments thereof, it should be understood that these do not limit the invention, and that it is possible to alter many structural or other details that may prove obvious to persons skilled in the art after interpreting the subject matter disclosed in the present description, claims and drawings. Therefore, the scope of the present invention includes any variant or equivalent that could be considered covered by the broadest range of the following claims.

What is claimed is:

1. A machine for manufacturing cables comprising a winch, which comprises a tube, wherein the machine, in an interior of the tube, further comprises:
    a pulley,
    a reducer,
    an input shaft to the reducer,
    a system for attaching the reducer
    wherein:
    the system for attaching the reducer comprises an outer bearing and an inner bearing which are concentric each other,
    the outer bearing is attached to the reducer and a structure that attaches the outer bearing to the tube,
    the inner bearing is attached to the pulley and to the structure, and
    the pulley is supported by said inner bearing and by bearings of said input shaft of the reducer.

2. The machine according to claim 1, wherein the outer bearing and the inner bearing are in different planes.

3. The machine according to claim 1, wherein the outer bearing is connected to the reducer by an outer face thereof, and to the structure by an inner face thereof.

4. The machine according to claim 1, wherein the inner bearing is connected to the pulley by an inner face thereof, and to the structure by an outer face thereof.

5. The machine according to claim 1, wherein the inner bearing and the outer bearing are attached to one another between an outer face of the inner bearing and the outer face of the outer bearing.

6. The machine according to claim 1, wherein the inner bearing and the outer bearing are attached to one another by means of the structure.

7. The machine according to claim 1, wherein a nominal rotational speed of the winch is greater than 650 rpm.

8. The machine according to claim 1, wherein both the inner bearing and the outer bearing are ball bearings.

9. The machine according to claim 1 comprising a single pulley connected to the reducer.

* * * * *